May 20, 1930.  F. W. SCHMIDT  1,759,325
RAIL MACHINING DEVICE
Filed Dec. 10, 1928
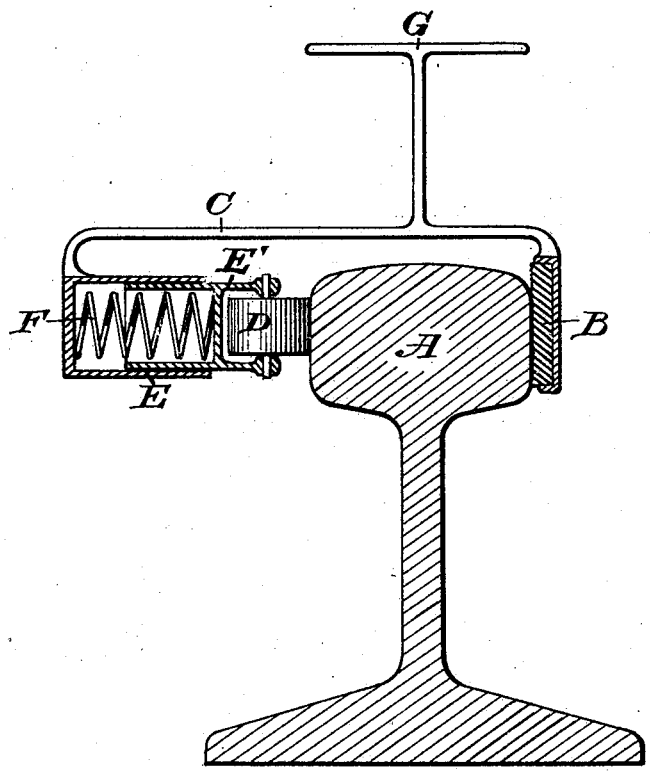
INVENTOR
Friedrich W. Schmidt
BY
HIS ATTORNEY Patented May 20, 1930

1,759,325

UNITED STATES PATENT OFFICE

FRIEDRICH W. SCHMIDT, OF BERLIN-MARIENDORF, GERMANY

RAIL-MACHINING DEVICE

Application filed December 10, 1928, Serial No. 324,875, and in Germany January 18, 1928.

The invention relates to certain improvements in devices for machining the collars formed by the alumino-thermic welding of rails to reduce the portions of the collars adjacent the rail heads to the proper contour of the heads, and has more particularly to do with the provision of a tool adapted to remove the portion of the welding collar on the side faces of T-rail heads.

The invention is illustrated in the accompanying drawing, in which the figure is a conventional representation of a plane or similar cutting tool for removing the portion of a welding collar in the lateral surface of a T-rail head.

In machining or reducing the welding collars of rails welded together by the aluminothermic or similar molten metal process, it has been customary to employ a hand tool, usually in the form of a plane or an abrasive implement, which is passed back and forth over the weld with sufficient pressure to cut away the projecting portions of the collar, especially on the tread and gauge faces of the T-rails. The removal of the collar on the lateral face of the rail head presents considerable difficulty, because the weight of the tool cannot be availed of to force the tool into cutting or abrading engagement with the metal of the collar, so that it has been necessary for the workmen to exert the necessary pressure on the tool to effect the desired result. The present invention is designed to provide a tool which automatically applies the necessary pressure to the cutting or abrading element, when the latter is engaged with the side face of the rail head, so that it is only necessary for the workmen to move the tool back and forth over the joint.

Referring to the drawing, A indicates a cross section of the rails at the welded joint, and B a conventional tool, in the form of a plane or abrasive implement, such as a file or a block of abrasive material, adapted to be engaged with the lateral face of the rail head for the purpose of removing the welding collar which projects normally from the surface of said face. The tool B is carried by one leg of a substantially U-shape frame C, which straddles the rail A, the other leg of the frame C having a horizontally ranging socket E, in which is mounted a spring plunger E' carrying one or more rolls D, which latter, when the frame is in position, is forced by the plunger by means of the actuating spring F into engagement with the side face of the rail head opposite that engaged by the tool B, the said spring exerting sufficient pressure to draw the tool B into cutting engagement with the contiguous rail face.

The frame C is preferably provided with an operating handle G by means of which the device may be moved back and forth over the joint in order to cause the tool B to plane off and otherwise reduce the portion of the collar lying in the side face of the rail head.

What I claim is:

1. A device for machining the lateral surfaces of rail head welding collars comprising a substantially U-shape frame to straddle the rail head, a tool for removing stock carried by one leg of the frame to engage one side of the rail head, and pressure exerting means carried by the other leg of the frame to engage the opposite side of the rail head and force the tool into cutting engagement with its contiguous rail face.

2. A device for machining the lateral surfaces of rail head welding collars comprising a substantially U-shape frame to straddle the rail head, a tool for removing stock carried by one leg of the frame to engage one side of the rail head, and yielding pressure exerting means carried by the other leg of the frame to engage the opposite side of the rail head and force the tool into cutting engagement with its contiguous rail face.

3. A device for machining the lateral surfaces of rail head welding collars comprising a substantially U-shape frame to straddle the rail head, a tool for removing stock carried by one leg of the frame to engage one side of the rail head, and a spring plunger carried by the other leg of the frame having a roller on its end to engage the opposite side of the rail head and force the tool into cutting engagement with its contiguous rail face.

In testimony whereof I affix my signature.

FRIEDRICH W. SCHMIDT.